(12) United States Patent
Seol et al.

(10) Patent No.: US 11,424,502 B2
(45) Date of Patent: Aug. 23, 2022

(54) BATTERY PACK

(71) Applicant: SAMSUNG SDI CO., LTD., Yongin-si (KR)

(72) Inventors: Jihwan Seol, Yongin-si (KR); Nohyun Kwag, Yongin-si (KR); Sanghoon Bae, Yongin-si (KR); Jooyul Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 16/264,203

(22) Filed: Jan. 31, 2019

(65) Prior Publication Data

US 2019/0237713 A1 Aug. 1, 2019

(30) Foreign Application Priority Data

Feb. 1, 2018 (KR) .................. 10-2018-0013078

(51) Int. Cl.
*H01M 10/42* (2006.01)
*H01M 10/613* (2014.01)
(Continued)

(52) U.S. Cl.
CPC ......... *H01M 50/20* (2021.01); *H01M 10/425* (2013.01); *H01M 10/4257* (2013.01);
(Continued)

(58) Field of Classification Search
CPC ........ H01M 2/021; H01M 2/027; H01M 2/30; H01M 2/307; H01M 10/425;
(Continued)

(56) References Cited

U.S. PATENT DOCUMENTS 7,671,565 B2   3/2010 Straubel et al.
7,923,144 B2   4/2011 Kohn et al.
(Continued)

FOREIGN PATENT DOCUMENTS

CN   103703873 A   4/2014
CN   106654135 A   5/2017
(Continued)

OTHER PUBLICATIONS

Extended European Search Report for corresponding European Patent Application No. 19154800.7, dated Jul. 8, 2019, 8 pages.
(Continued)

*Primary Examiner* — Edward J. Schmiedel
(74) *Attorney, Agent, or Firm* — Lewis Roca Rothgerber Christie LLP (57) ABSTRACT

A battery pack includes: a plurality of battery cells, each including a negative electrode and a positive electrode, the positive and negative electrodes being arranged on a same side of the battery cell; a substrate arranged on the plurality of battery cells and including a first surface and a second surface located on opposite sides of the substrate, and a through hole exposing the negative electrode and the positive electrode of each of the plurality of battery cells; a first conductive plate arranged on the first surface of the substrate and including a first hole; and a second conductive plate arranged on the second surface of the substrate and including a second hole.

10 Claims, 9 Drawing Sheets

(51) Int. Cl.
  *H01M 10/643* (2014.01)
  *H01M 50/20* (2021.01)
  *H01M 10/6556* (2014.01)
  *H01M 10/6554* (2014.01)
  *H01M 50/502* (2021.01)
  *H01M 50/581* (2021.01)

(52) U.S. Cl.
  CPC ....... *H01M 10/613* (2015.04); *H01M 10/643* (2015.04); *H01M 10/6554* (2015.04); *H01M 10/6556* (2015.04); *H01M 50/502* (2021.01); *H01M 50/581* (2021.01); *H01M 2010/4271* (2013.01); *H01M 2200/00* (2013.01); *H01M 2200/103* (2013.01)

(58) Field of Classification Search
  CPC ......... H01M 10/4257; H01M 10/4271; H01M 10/613; H01M 10/643; H01M 10/6553; H01M 10/6554; H01M 10/6556; H01M 50/154; H01M 50/172; H01M 50/512
  USPC ........................................................ 429/170
  See application file for complete search history.

(56) References Cited

U.S. PATENT DOCUMENTS

| | | | |
|---|---|---|---|
| 8,241,772 B2 | 8/2012 | Hermann et al. | |
| 8,263,250 B2 | 9/2012 | Hermann | |
| 8,389,139 B2 | 3/2013 | Hermann et al. | |
| 9,444,087 B1 | 9/2016 | Jeon | |
| 9,515,309 B2 | 12/2016 | Yoon et al. | |
| 2007/0188147 A1* | 8/2007 | Straubel ................ | B60L 3/0046 320/134 |
| 2014/0120393 A1* | 5/2014 | Desbois-Renaudin ..................... | H05K 1/181 429/92 |
| 2014/0255748 A1* | 9/2014 | Jan ........................ | H01M 10/04 429/120 |
| 2014/0255750 A1 | 9/2014 | Jan et al. | |
| 2016/0218401 A1 | 7/2016 | Hermann et al. | |
| 2017/0141378 A1 | 5/2017 | Biskup et al. | |
| 2019/0280267 A1 | 9/2019 | Bae et al. | |

FOREIGN PATENT DOCUMENTS

| | | |
|---|---|---|
| CN | 206471410 U | 9/2017 |
| CN | 206685445 U | 11/2017 |
| CN | 107611329 A | 1/2018 |
| JP | 4963902 B2 | 3/2008 |
| JP | 2010-282811 A | 12/2010 |
| KR | 10-2010-0041463 A | 4/2010 |
| KR | 10-1406240 B1 | 6/2014 |
| KR | 10-2018-0066683 A | 6/2018 |
| WO | WO 2015/061443 A | 4/2015 |
| WO | WO 2018/105905 A1 | 6/2018 |
| WO | WO 2019/022388 A1 | 1/2019 |

OTHER PUBLICATIONS

China Office Action in corresponding China Patent Application No. 201910103187.0, China Office Action dated Jul. 16, 2021, including English translation (23 pgs.).

European Office Action from corresponding European Application No. 19154800.7, European Office Action dated Sep. 30, 2021 (8 pgs.).

China Office Action from corresponding China Patent Application No. 201910103187.0, China Office Action dated Apr. 2, 2022, with English Translation (21 pgs.).

\* cited by examiner

BATTERY PACK

CROSS-REFERENCE TO RELATED APPLICATION

This application claims priority to and the benefit of Korean Patent Application No. 10-2018-0013078, filed on Feb. 1, 2018 in the Korean Intellectual Property Office, the entire disclosure of which is incorporated herein by reference.

BACKGROUND

1. Field

Aspects of one or more embodiments relate to battery packs.

2. Description of the Related Art

Secondary batteries are rechargeable, unlike primary batteries. Recently, high-output secondary batteries using non-aqueous electrolytes of high energy density have been developed.

In general, secondary batteries (herein also referred to as "battery cells") may be used as energy sources for mobile devices, electric vehicles, hybrid vehicles, electricity, or the like. The secondary batteries may be used in various forms, depending on the types of external devices to which they are applied.

For example, a small mobile electronic device, such as a mobile phone or a notebook computer may operate for a certain time according to the output and capacity of a single battery cell or several battery cells. However, in the case of devices that require high power for a long period of time, such as in the case of electric bicycles, hybrid vehicles, or electric vehicles, which have high power consumption, tens to hundreds of battery cells may be electrically connected to form a large-capacity battery pack so as to increase output and capacity.

In the case of a battery pack including tens to hundreds of secondary batteries, since the battery pack is used for a long time through charging and discharging, the mechanical and electrical connections between the battery cells may need to be stably maintained.

Information disclosed in this Background section was already known to the inventors before achieving embodiments of the present disclosure or is technical information acquired in the process of achieving embodiments of the present disclosure. Therefore, it may contain information that does not form the prior art that is already known to the public in this country.

SUMMARY

According to an aspect of one or more embodiments, a battery pack is mechanically and electrically stable.

Additional aspects will be set forth, in part, in the description which follows and, in part, will be apparent from the description, or may be learned by practice of the presented embodiments.

According to one or more embodiments, a battery pack includes: a plurality of battery cells, each including a negative electrode and a positive electrode arranged on a same side of the battery cell; a substrate arranged on the plurality of battery cells and including a first surface and a second surface located on opposite sides of the substrate and including a through hole exposing the negative electrode and the positive electrode of each of the plurality of battery cells; a first conductive plate arranged on the first surface of the substrate and including a first hole; a second conductive plate arranged on the second surface of the substrate and including a second hole; a first connection tab electrically connecting one of the negative electrode and the positive electrode with the first conductive plate through the second hole and the through hole; and a second connection tab electrically connecting the other one of the negative electrode and the positive electrode with the second conductive plate.

In one or more embodiments, the substrate may include a printed circuit board (PCB).

In one or more embodiments, the through hole, the first hole, and the second hole may at least partially overlap each other.

In one or more embodiments, one of the positive electrode and the negative electrode of each of the plurality of battery cells may be located at a central portion of a first end side of the battery cell, and the other one of the positive electrode and the negative electrode may be located at a peripheral portion of the first end side.

In one or more embodiments, the first connection tab and the second connection tab may respectively include fusible links that electrically connect the battery cell with the first conductive plate and the battery cell with the second conductive plate, respectively, wherein the fusible links are fused, when an overcurrent flows therethrough, to block current flow between the battery cell and the first conductive plate and current flow between the battery cell and the second conductive plate, respectively.

In one or more embodiments, the battery pack may further include a cooling unit arranged at a second end side opposite a first end side of the plurality of battery cells with the plurality of battery cells therebetween.

In one or more embodiments, the cooling unit may include a thermoconductive plate.

In one or more embodiments, the cooling unit may include a flow path through which a cooling fluid is configured to flow.

In one or more embodiments, the battery pack may further include a protection circuit module arranged over the plurality of battery cells, wherein the protection circuit module may include the substrate, the first conductive plate, the second conductive plate, and a safety device mounted on the substrate.

According to one or more embodiments, a battery pack includes: a plurality of battery cells, each including a negative electrode and a positive electrode arranged on a same side of the battery cell; a substrate arranged on the plurality of battery cells and including a first surface and a second surface located on opposite sides of the substrate and including a through hole exposing the negative electrode and the positive electrode of each of the plurality of battery cells; a conductive pad unit including a first conductive pad and a second conductive pad, each arranged on a surface of the substrate; a first connection tab electrically connecting one of the negative electrode and the positive electrode with the first conductive pad through the through hole; and a second connection tab electrically connecting the other one of the negative electrode and the positive electrode with the second conductive pad through the through hole.

In one or more embodiments, the substrate may include a printed circuit board (PCB).

In one or more embodiments, one of the positive electrode and the negative electrode of each of the plurality of battery cells may be located at a central portion of a first end side of the battery cell, and the other one of the positive electrode and the negative electrode may be located at a peripheral portion of the first end side.

In one or more embodiments, the first connection tab and the second connection tab may respectively include fusible links that electrically connect the battery cell with the first conductive pad and the battery cell with the second conductive pad, respectively, wherein the fusible links are fused, when an overcurrent flows therethrough, to block current flow between the battery cell and the first conductive pad and current flow between the battery cell and the second conductive pad, respectively.

In one or more embodiments, the battery pack may further include a third conductive pad arranged on the second surface of the substrate, wherein the substrate unit may further include a first via hole and a second via hole, each penetrating the substrate, the first conductive pad and the third conductive pad may be electrically connected through the first via hole, and the second conductive pad and the third conductive pad may be electrically connected through the second via hole.

In one or more embodiments, the battery pack may further include a conductive pattern arranged on a surface of the substrate to electrically connect the first conductive pad with the second conductive pad.

In one or more embodiments, the conductive pattern may include fuses that are fused, when an overcurrent flows therethrough, to block current flow between the conductive pattern and the first conductive pad and current flow between the conductive pattern and the second conductive pad, respectively.

In one or more embodiments, the battery pack may further include a safety device mounted on the substrate, wherein the safety device may be electrically connected to the conductive pattern.

In one or more embodiments, the battery pack may further include a cooling unit installed on a second end side opposite a first end side of the plurality of battery cells with the plurality of battery cells therebetween.

In one or more embodiments, the cooling unit may include a thermoconductive plate.

In one or more embodiments, the cooling unit may include a flow path through which a cooling fluid is configured to flow.

BRIEF DESCRIPTION OF THE DRAWINGS

These and/or other aspects will become apparent and more readily appreciated from the following description of some exemplary embodiments, taken in conjunction with the accompanying drawings, in which.

DETAILED DESCRIPTION

Reference will now be made in further detail to some embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items.

The present disclosure may include various embodiments and modifications, and certain embodiments thereof are illustrated in the drawings and will be described herein in further detail. The effects and features of the present disclosure and the accomplishing methods thereof will become apparent from the following description of the embodiments taken in conjunction with the accompanying drawings. However, the present disclosure is not limited to the embodiments described below, and may be embodied in various modes.

Herein, some embodiments of the present disclosure will be described in further detail with reference to the accompanying drawings. In the following description, like reference numerals will denote like elements, and redundant descriptions thereof may be omitted.

It is to be understood that, although the terms "first," "second," etc. may be used herein to describe various components, these components should not be limited by these terms. These terms are used to distinguish one component from another.

As used herein, the singular forms "a," "an," and "the" are intended to include the plural forms as well, unless the context clearly indicates otherwise.

It is to be understood that the terms "comprise," "include," and "have" used herein specify the presence of stated features or components, but do not preclude the presence or addition of one or more other features or components.

It is to be understood that when a layer, region, or component is referred to as being "formed on" another layer, region, or component, it may be directly or indirectly formed on the other layer, region, or component. That is, for example, one or more intervening layers, regions, or components may be present.

Sizes of components in the drawings may be exaggerated for convenience of description. In other words, since the sizes and thicknesses of components in the drawings may be arbitrarily illustrated for convenience of description, the following embodiments are not limited thereto.

When a certain embodiment may be implemented differently, a particular process order may be performed differently from the described order. For example, two consecutively described processes may be performed substantially at the same time or performed in an order opposite to the described order.

It is to be understood that when a layer, region, or component is referred to as being "connected to" another layer, region, or component, it may be directly connected to the other layer, region, or component or may be indirectly connected to the other layer, region, or component with one or more intervening layers, regions, or components interposed therebetween. For example, it is to be understood that when a layer, region, or component is referred to as being "electrically connected to" another layer, region, or component, it may be directly electrically connected to the other layer, region, or component or may be indirectly electrically connected to the other layer, region, or component with one or more intervening layers, regions, or components interposed therebetween.

Spatially relative terms, such as "beneath," "below," "lower," "above," "upper," and the like, may be used herein for ease of description to describe one element or feature's relationship to another element(s) or feature(s) as illustrated in the figures. It is to be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which example embodiments of the inventive concept belong. It is to be further understood that terms, such as those defined in commonly-used dictionaries, should be interpreted as having a meaning that is consistent with their meaning in the context of the relevant art and will not be interpreted in an idealized or overly formal sense unless expressly so defined herein.

Figure 1:
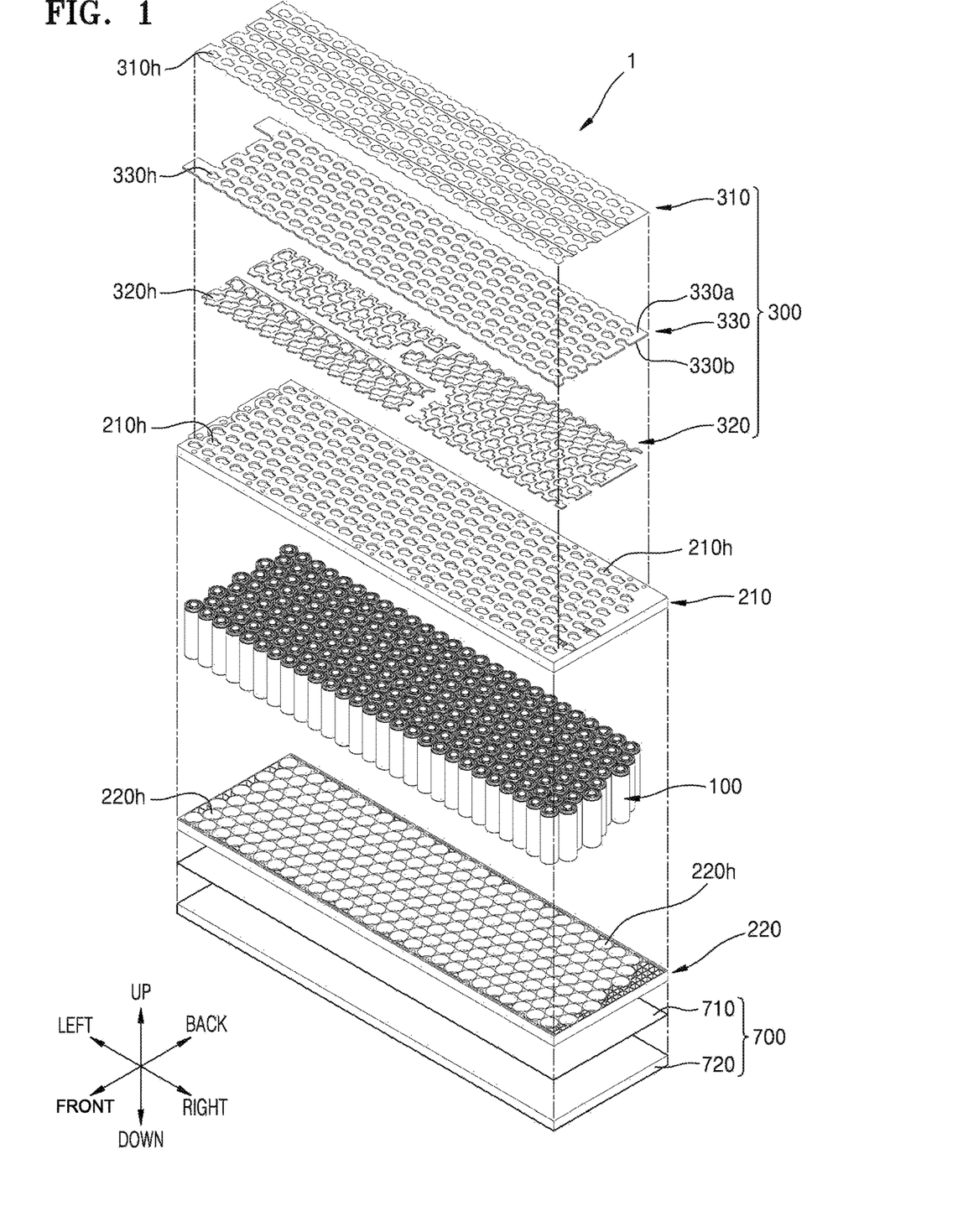
FIG. 1 is an exploded perspective view schematically illustrating a battery pack according to an embodiment of the present disclosure.
Figure 2A:
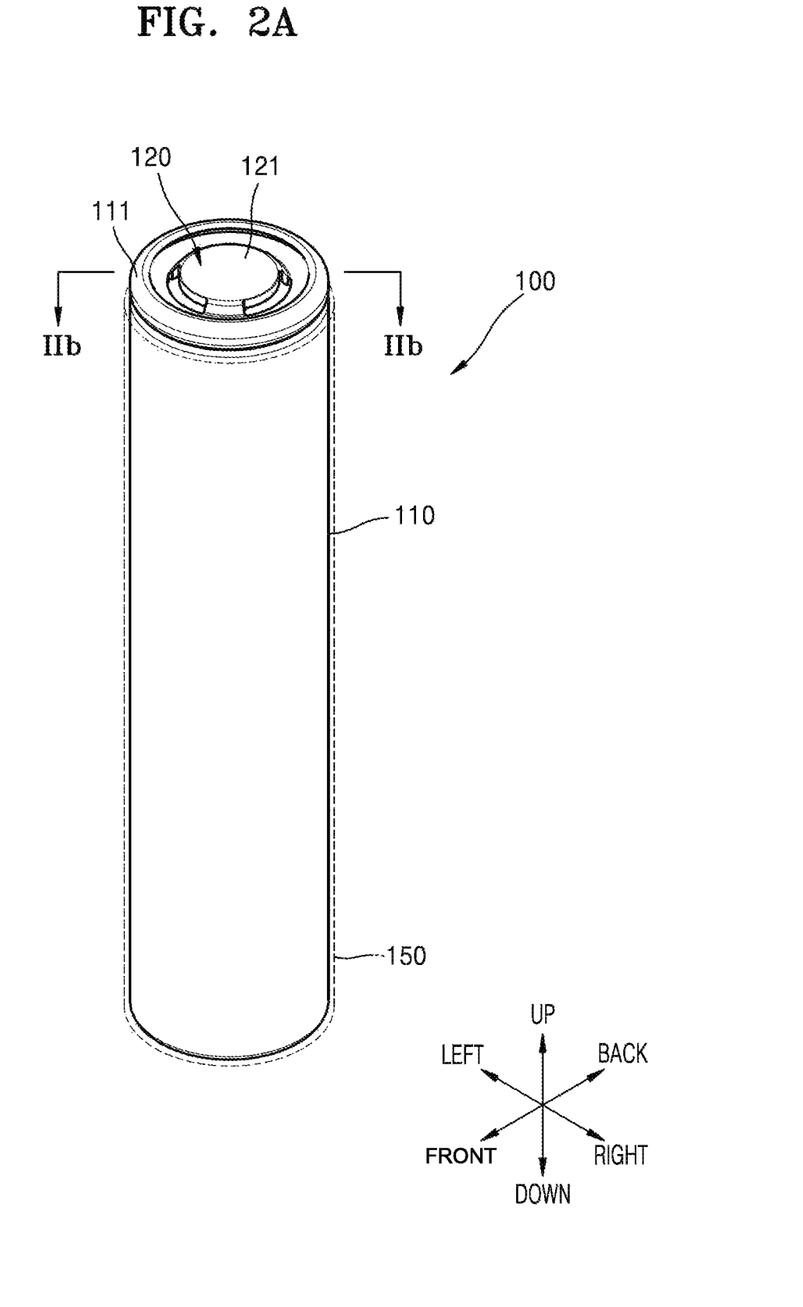
FIG. 2A is a perspective view illustrating a battery cell in FIG. 1.

FIG. 1 is an exploded perspective view schematically illustrating a battery pack 1 according to an embodiment of the present disclosure; FIG. 2A is a perspective view illustrating a battery cell in FIG. 1; and FIG. 2B is a cross-sectional view taken along the line IIb-IIb of FIG. 2A.

Referring to FIG. 1, the battery pack 1 may include a plurality of battery cells 100, first and second holder structures 210 and 220 arranged over and under the plurality of battery cells 100 respectively, a substrate unit 330 arranged over the plurality of battery cells 100, a protection circuit module 300 including first and second conductive plates 310 and 320 arranged on a top surface 330a and a bottom surface 330b of the substrate unit 330, respectively, and a cooling unit 700 arranged under the battery cells 100.

Figure 2B:
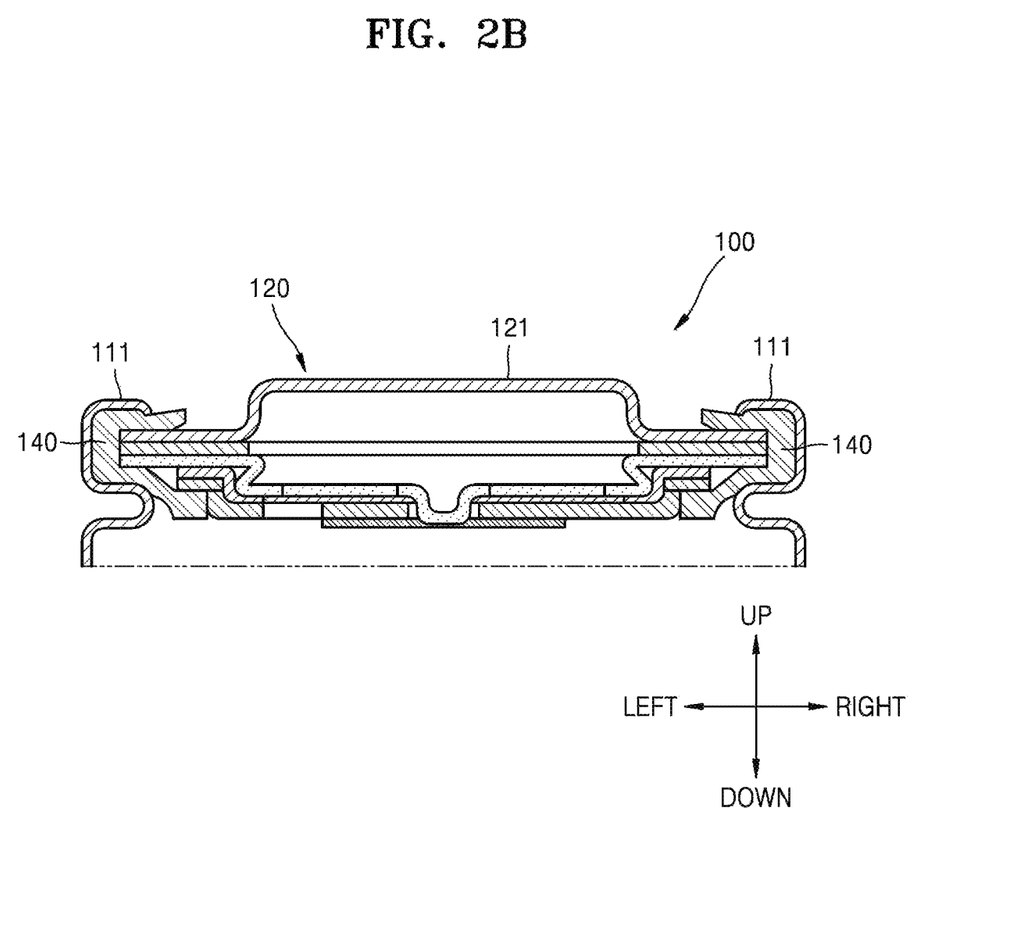
FIG. 2B is a cross-sectional view taken along the line IIb-IIb of FIG. 2A.

Referring to FIGS. 1, 2A, and 2B, each of the battery cells 100 may include a can 110 accommodating an electrode assembly, and a cap plate 120 covering a top portion of the can 110. Although not illustrated, the electrode assembly may include a negative electrode plate, a positive electrode plate, and a separator interposed therebetween, and the electrode assembly may be accommodated in the can 110, for example, by being rolled into a cylindrical shape. In a non-limiting embodiment, the positive electrode plate may include an aluminum foil coated with a positive electrode active material of lithium cobalt oxide ($LiCoO_2$), and the negative electrode plate may include a copper foil coated with a negative electrode active material, such as graphite. The separator may prevent or substantially prevent a short circuit between the negative electrode plate and the positive electrode plate and allow only lithium ions to move therebetween.

In an embodiment, the can 110 may have a cylindrical shape with one side (e.g., a top side) opened. The can 110 may be formed of a conductive material, such as steel, stainless steel, aluminum, or an equivalent thereof; however, the present disclosure is not limited thereto.

A top portion 111 of the can 110 may be coupled with the cap plate 120 and sealed by the cap plate 120, and a gasket 140 of an insulating material may be interposed between the top portion 111 of the can 110 and the cap plate 120. The cap plate 120 may be formed of a conductive material, such as steel, stainless steel, aluminum, or an equivalent thereof; however, the present disclosure is not limited thereto.

One of the negative electrode plate and the positive electrode plate of the electrode assembly may be electrically connected to the can 110 and the other one may be electrically connected to the cap plate 120. Thus, the top portion 111 of the can 110 and a top surface 121 of the cap plate 120 may be a negative electrode and a positive electrode of the battery cell 100, respectively. Herein, for convenience of description, the top portion 111 of the can 110 and the top surface 121 of the cap plate 120 will be assumed as a negative electrode and a positive electrode of the battery cell 100, respectively, and the top portion 111 of the can 110 will be referred to as a negative electrode and the top surface 121 of the cap plate 120 will referred to as a positive electrode.

In an embodiment, at least a side surface of the can 110 may be covered with an insulating sheet 150. The insulating sheet 150 may be a film having an insulating material and may cover the side surface of the can 110 or all or some of the side surface and the bottom surface (opposite to the cap plate 120) of the can 110.

The battery cell 100 according to embodiments of the present disclosure may have a structure in which the negative electrode 111 and the positive electrode 121 are exposed on the same side, that is, on the top side of the battery cell 100, as described above. For example, the positive electrode 121 may be arranged at a central portion of the top side of the battery cell 100, and the negative electrode 111 may be arranged at a peripheral portion of the top side of the battery cell 100.

Referring to FIG. 1, the battery cells 100 may be arranged between the first and second holder structures 210 and 220 such that the side surfaces thereof are parallel to each other. The battery cells 100 may be arranged such that both the negative electrode 111 and the positive electrode 121 of each battery cell 100 face upward.

The first and second holder structures 210 and 220 may be arranged over and under the plurality of battery cells 100, respectively, and may be located to face each other. The first holder structure 210 may be arranged over the plurality of battery cells 100 and may have holes 210h exposing the negative electrode 111 and the positive electrode 121 arranged at the top side of each battery cell 100. The second holder structure 220 may be arranged under the plurality of battery cells 100 and may have grooves 220h capable of accommodating each of the battery cells 100. The grooves 220h may penetrate through the second holder structure 220 or may be recessed without penetrating therethrough. Each of the battery cells 100 may be inserted into the groove 220h of the second holder structure 220 and fixed at a corresponding position.

The protection circuit module 300 may be arranged on the first holder structure 210. The protection circuit module 300 may include the substrate unit 330, the first conductive plate 310 located on the top surface 330a of the substrate unit 330, and the second conductive plate 320 located on the bottom surface 330b of the substrate unit 330. In an embodiment, a plurality of first conductive plates 310 and a plurality of second conductive plates 320 may be provided. Herein, a description will be given based on an embodiment in which a plurality of first conductive plates 310 and a plurality of second conductive plates 320 are provided.

In an embodiment of the present disclosure, the substrate unit 330 may include a printed circuit board (PCB). Thus, although not illustrated in FIG. 1, a protection circuit, a safety device, and the like for safety of the battery cells 100 may be arranged on the substrate unit 330. The safety device may be, for example, a fuse, a thermistor, or a positive temperature coefficient (PTC) device. The protection circuit module 300 may be electrically connected to the battery cells 100 to control the charge/discharge of the battery cells 100 and prevent or substantially prevent overheat and explosion caused by overcharge, overdischarge, or overcurrent.

The first conductive plates 310 and the second conductive plates 320 may be arranged over the plurality of battery cells 100, for example, on the first holder structure 210 with the substrate unit 330 therebetween. In an embodiment, the first conductive plates 310 and the second conductive plates 320 may be arranged to be offset to partially overlap each other in a left/right direction in FIG. 1. For example, each of the second conductive plates 320 may be offset in the left/right direction to simultaneously overlap the adjacent first conductive plates 310.

The battery cells 100 may be electrically connected through the first and second conductive plates 310 and 320. In other words, the battery cells 100 may be connected to each other by the first and second conductive plates 310 and 320. For this, the first and second conductive plates 310 and 320 may include a conductive material, such as aluminum, copper, nickel, titanium, or an alloy thereof; however, the present disclosure is not limited thereto.

The first and second conductive plates 310 and 320 may respectively include holes 310h and 320h exposing the negative electrode 111 and the positive electrode 121 arranged at the top side of each of the battery cells 100. First and second connection tabs 410 and 420 (see FIG. 4) to be described below may connect the first and second conductive plates 310 and 320 with the negative electrode 111 or the positive electrode 121 of the battery cells 100 through the holes 310h and 320h to connect the battery cells 100 in series and/or in parallel. Electrical connections between the first and second conductive plates 310 and 320 and the battery cells 100 will be described further below with reference to FIG. 3.

The substrate unit 330 may be interposed between the first and second conductive plates 310 and 320. In other words, the first and second conductive plates 310 and 320 may be located on one surface and the other surface of the substrate unit 330, respectively. As described above, in an embodiment, the substrate unit 330 may be understood as the PCB of the protection circuit module 300, and the first and second conductive plates 310 and 320 may be integrally coupled with the substrate unit 330. Thus, in the battery pack 1 according to an embodiment of the present disclosure, since the first and second conductive plates 310 and 320 are integrally coupled to the substrate unit 330 that is a PCB, metal plates stacked as a separate member on the battery cells 100 may be omitted.

The substrate unit 330 may include a hole 330h exposing the negative electrode 111 and the positive electrode 121 arranged at the top surface of each of the battery cells 100 such that each of the first conductive plates 310 is connected to the negative electrode 111 or the positive electrode 121 of the battery cell 100 through the first connection tab 410 to be described below.

In an embodiment, the substrate unit 330 may entirely overlap at least the second conductive plates 320 in order to prevent or substantially prevent the first and second conductive plates 310 and 320 from directly contacting each other. For example, the outer end of the substrate unit 330 may extend farther than the outer end of the second conductive plates 320, and the inner end of the substrate unit 330 adjacent to the hole 330h of the substrate unit 330 may extend farther than the inner end of the second conductive plates 320 (i.e., the inner end adjacent to the hole 320h of the second conductive plate 320). Thus, the size of the hole 330h of the substrate unit 330 may be smaller than the size of the hole 320h of the second conductive plate 320.

In an embodiment, a protection cover (not illustrated) may be further arranged over the protection circuit module 300. The protection cover (not illustrated) may cover all of the protection circuit module 300 including the first and second conductive plates 310 and 320 and protect the battery pack 1 from external conductors, foreign materials, and the like.

The cooling unit 700 may be arranged under the battery cells 100. In an embodiment, the cooling unit 700 may include a thermoconductive plate 710. In a non-limiting embodiment, the thermoconductive plate 710 may include an anodized aluminum plate. The cooling unit 700 will be described below in further detail with reference to FIG. 9.

Figure 3:
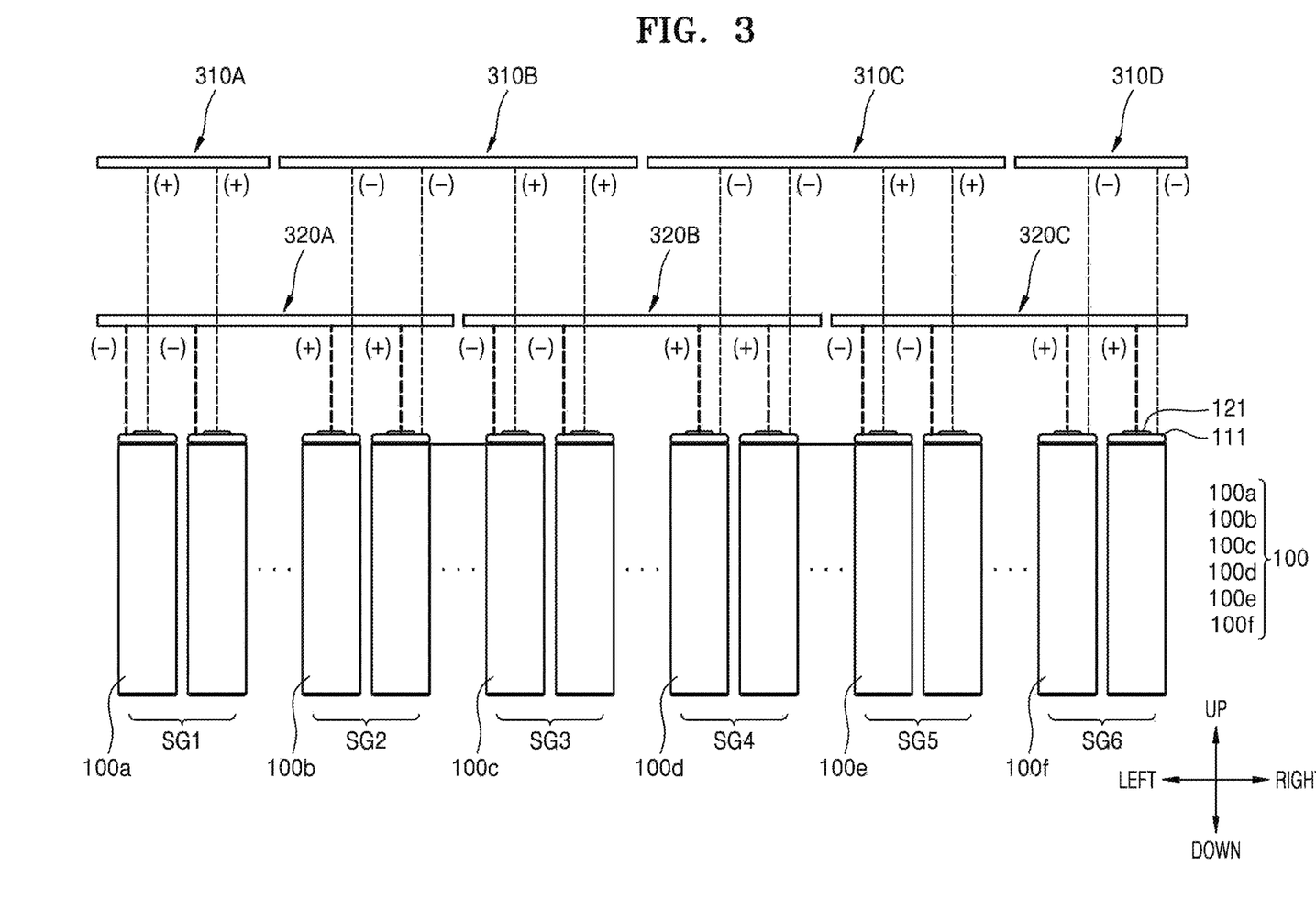
FIG. 3 schematically illustrates electrical connections between battery cells and first and second conductive plates.

FIG. 3 schematically illustrates electrical connections between battery cells and first and second conductive plates.

Dotted lines in FIG. 3 represent electrical connections. For convenience of description, FIG. 3 illustrates an embodiment in which four first conductive plates are provided and three second conductive plates are provided. For example, as illustrated in FIG. 3, the first conductive plates 310 may include a first first conductive plate 310A, a second first conductive plate 310B, a third first conductive plate 310C, and a fourth first conductive plate 310D sequentially in the left/right direction. The second conductive plates 320 may include a first second conductive plate 320A, a second second conductive plate 320B, and a third second conductive plate 320C in the left/right direction. Herein, unless otherwise described, the first conductive plate 310 may represent any one of the first to fourth first conductive plates 310A, 310B, 310C, and 310D, and the second conductive plate 320 may represent the first to third second conductive plates 320A, 320B, and 320C. Also, although FIG. 3 illustrates that the first conductive plates 310 and the second conductive plates 320 are arranged sequentially in the left/right direction, the positions of the first and second conductive plates 310 and 320 may be modified in various embodiments according to the connection structures of the battery cells 100.

Referring to FIG. 3, the first and second conductive plates 310 and 320 may be arranged over the battery cells 100 and may be offset by certain distances in the left/right direction (i.e., the surface direction of the first and second conductive plates 310 and 320) to partially overlap each other. For example, each of the second conductive plates 320 may be offset to overlap two adjacent first conductive plates 310.

In some embodiments, a portion of the first second conductive plate 320A may overlap the first first conductive plate 310A and another portion thereof may overlap the second first conductive plate 310B. A portion of the second second conductive plate 320B may overlap the second first conductive plate 310B and another portion thereof may overlap the third first conductive plate 310C. A portion of the third second conductive plate 320C may overlap the third first conductive plate 310C and another portion thereof may overlap the fourth first conductive plate 310D.

Battery cells 100a of a first subgroup SG1 among the battery cells 100, for example, the battery cells 100a arranged to overlap the first first conductive plate 310A and the first second conductive plate 320A, may be connected to the first first conductive plate 310A and the first second conductive plate 320A. For example, the positive electrode 121 of the battery cells 100a may be connected to the first first conductive plate 310A, and the negative electrode 111 thereof may be connected to the first second conductive plate 320A.

Battery cells 100b of a second subgroup SG2 among the battery cells 100, for example, the battery cells 100b arranged to overlap the second first conductive plate 310B and the first second conductive plate 320A, may be connected to the second first conductive plate 310B and the first second conductive plate 320A. For example, the negative electrode 111 of the battery cells 100b may be connected to the second first conductive plate 310B, and the positive electrode 121 thereof may be connected to the first second conductive plate 320A.

Battery cells 100c of a third subgroup SG3 among the battery cells 100, for example, the battery cells 100c arranged to overlap the second first conductive plate 310B and the second second conductive plate 320B, may be connected to the second first conductive plate 310B and the second second conductive plate 320B. For example, the negative electrode 111 of the battery cells 100c may be connected to the second second conductive plate 320B, and the positive electrode 121 thereof may be connected to the second first conductive plate 310B.

Battery cells 100d of a fourth subgroup SG4 among the battery cells 100, for example, the battery cells 100d arranged to overlap the third first conductive plate 310C and the second second conductive plate 320B, may be connected to the third first conductive plate 310C and the second second conductive plate 320B. For example, the negative electrode 111 of the battery cells 100d may be connected to the third first conductive plate 310C, and the positive electrode 121 thereof may be connected to the second second conductive plate 320B.

Battery cells 100e of a fifth subgroup SG5 among the battery cells 100, for example, the battery cells 100e arranged to overlap the third first conductive plate 310C and the third second conductive plate 320C, may be connected to the third first conductive plate 310C and the third second conductive plate 320C. For example, the negative electrode 111 of the battery cells 100e may be connected to the third second conductive plate 320C, and the positive electrode 121 thereof may be connected to the third first conductive plate 310C.

Battery cells 100f of a sixth subgroup SG6 among the battery cells 100, for example, the battery cells 100f arranged to overlap the fourth first conductive plate 310D and the third second conductive plate 320C, may be connected to the fourth first conductive plate 310D and the third second conductive plate 320C. For example, the negative electrode 111 of the battery cells 100f may be connected to the fourth first conductive plate 310D, and the positive electrode 121 thereof may be connected to the third second conductive plate 320C.

In an embodiment, among the first conductive plates 310, the first conductive plate 310 arranged at the center thereof, for example, each of the second and third first conductive plates 310B and 310C, may electrically connect the battery cells 100 of one subgroup in parallel and may electrically connect the battery cells 100 of adjacent subgroups in series. On the other hand, among the first conductive plates 310, the first conductive plate 310 arranged at the edge thereof, for example, each of the first and fourth first conductive plates 310A and 310D, may electrically connect the battery cells 100 of one subgroup in parallel.

Similarly, the second conductive plate 320, for example, each of the first to third second conductive plates 320A, 320B, and 320C, may electrically connect the battery cells 100 of one subgroup in parallel and may electrically connect the battery cells 100 of adjacent subgroups in series.

Figure 4:
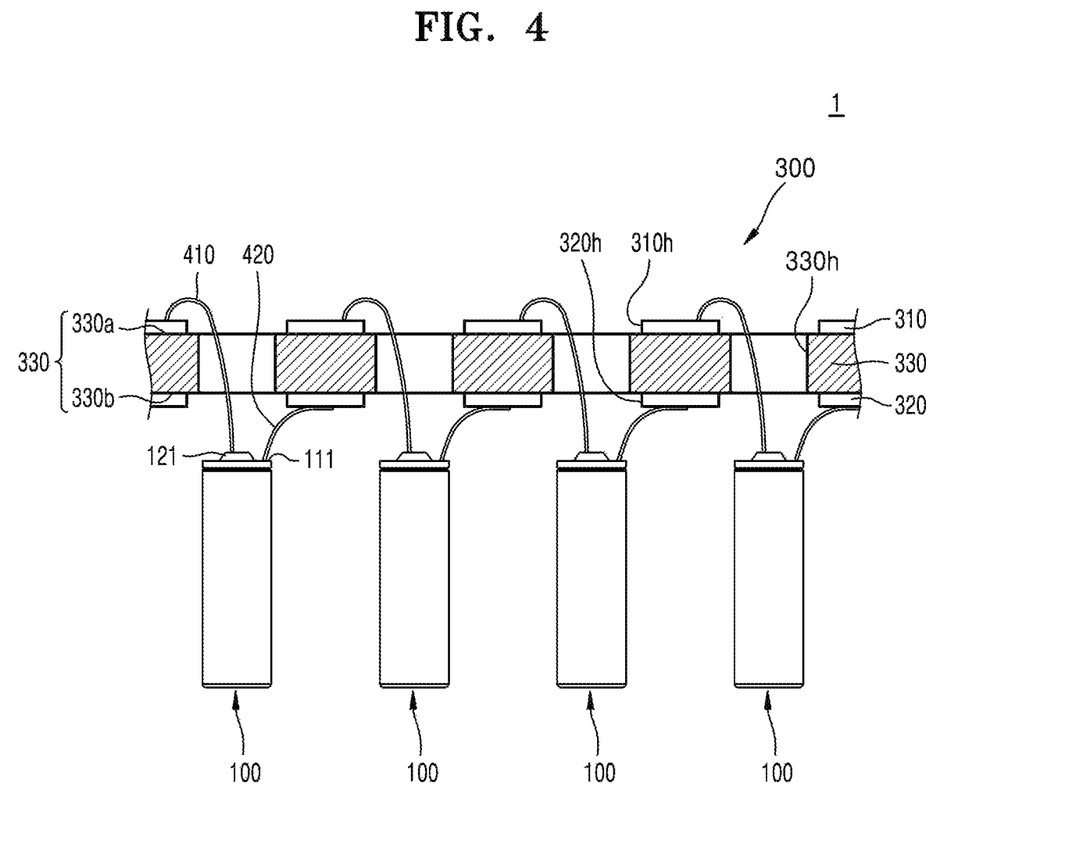
FIG. 4 is a cross-sectional view schematically illustrating a battery pack according to an embodiment of the present disclosure.

FIG. 4 is a cross-sectional view schematically illustrating the battery pack 1 according to an embodiment of the present disclosure. FIG. 4 illustrates electrical connections between battery cells 100 and first and second conductive plates 310 and 320 in the battery pack 1 according to an embodiment of the present disclosure.

Referring to FIG. 4, the battery pack 1 according to the present embodiment may include the substrate unit 330 having one surface 330a and the other surface 330b located on opposite sides thereof, the first conductive plate 310 arranged on the surface 330a of the substrate unit 330, and the second conductive plate 320 arranged on the other surface 330b of the substrate unit 330. The substrate unit 330, the first conductive plate 310, and the second conductive plate 320 may respectively have a through hole 330h, a first hole 310h, and a second hole 320h to expose the positive electrode 121 and the negative electrode 111 of each of the battery cells 100, and the through hole 330h, the first hole 310h, and the second hole 320h may be arranged to at least partially overlap each other.

In the present embodiment, the first conductive plate 310 and the second conductive plate 320 are arranged on the surface 330a and the other surface 330b, respectively. However, in another embodiment, the first conductive plate 310 and the second conductive plate 320 may be arranged on a plurality of substrate units, respectively. Also, in this case, the plurality of substrate units may be arranged on the battery cells 100.

The first connection tab 410 may electrically connect one of the negative electrode 111 and the positive electrode 121 of the battery cell 100 to the first conductive plate 310. In FIG. 4, one side of the first connection tab 410 may be connected to the positive electrode 121 of the battery cell 100, and the other side of the first connection tab 410 may be electrically connected to the first conductive plate 310. Similarly, the second connection tab 420 may electrically connect the other one of the negative electrode 111 and the positive electrode 121 of the battery cell 100 to the second conductive plate 320. In FIG. 4, one side of the second connection tab 420 may be connected to the negative electrode 111 of the battery cell 100, and the other side of the second connection tab 420 may be electrically connected to the second conductive plate 320.

In the present embodiment, the first connection tab 410 and the second connection tab 420 may respectively include fusible links that electrically connect the battery cell 100 with the first conductive plate 310 and the battery cell 100 with the second conductive plate 320, respectively, and are fused, when an overcurrent flows through the battery cell 100, to block a current flow between the battery cell 100 and the first conductive plate 310 and a current flow between the battery cell 100 and the second conductive plate 320, respectively. That is, the first connection tab 410 and the second connection tab 420 may function as a tab electrically connecting the battery cell 100 with the first conductive plate 310 and the battery cell 100 with the second conductive plate 320, respectively, and may also function as a fuse.

Figure 5:
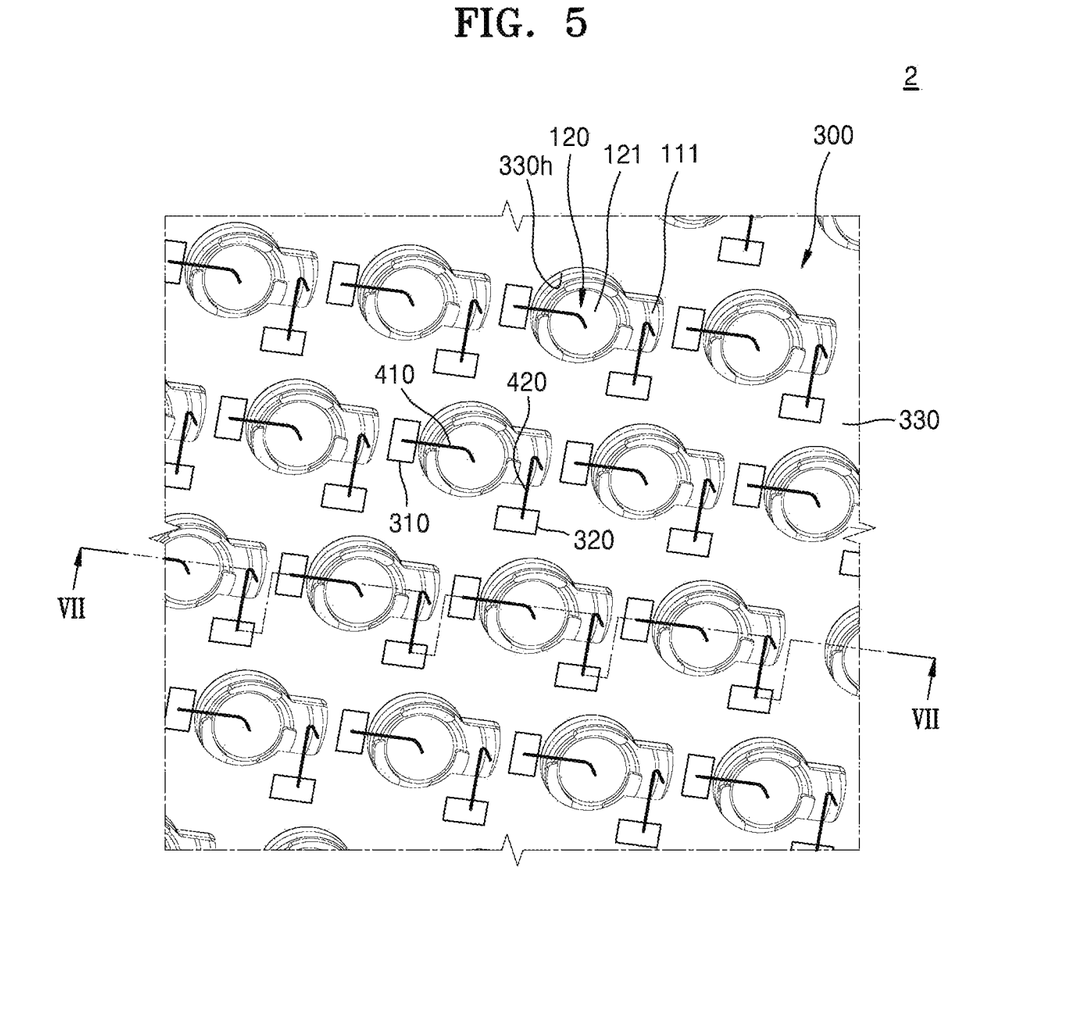
FIG. 5 is a perspective view schematically illustrating a battery pack according to another embodiment of the present disclosure.
Figure 6:
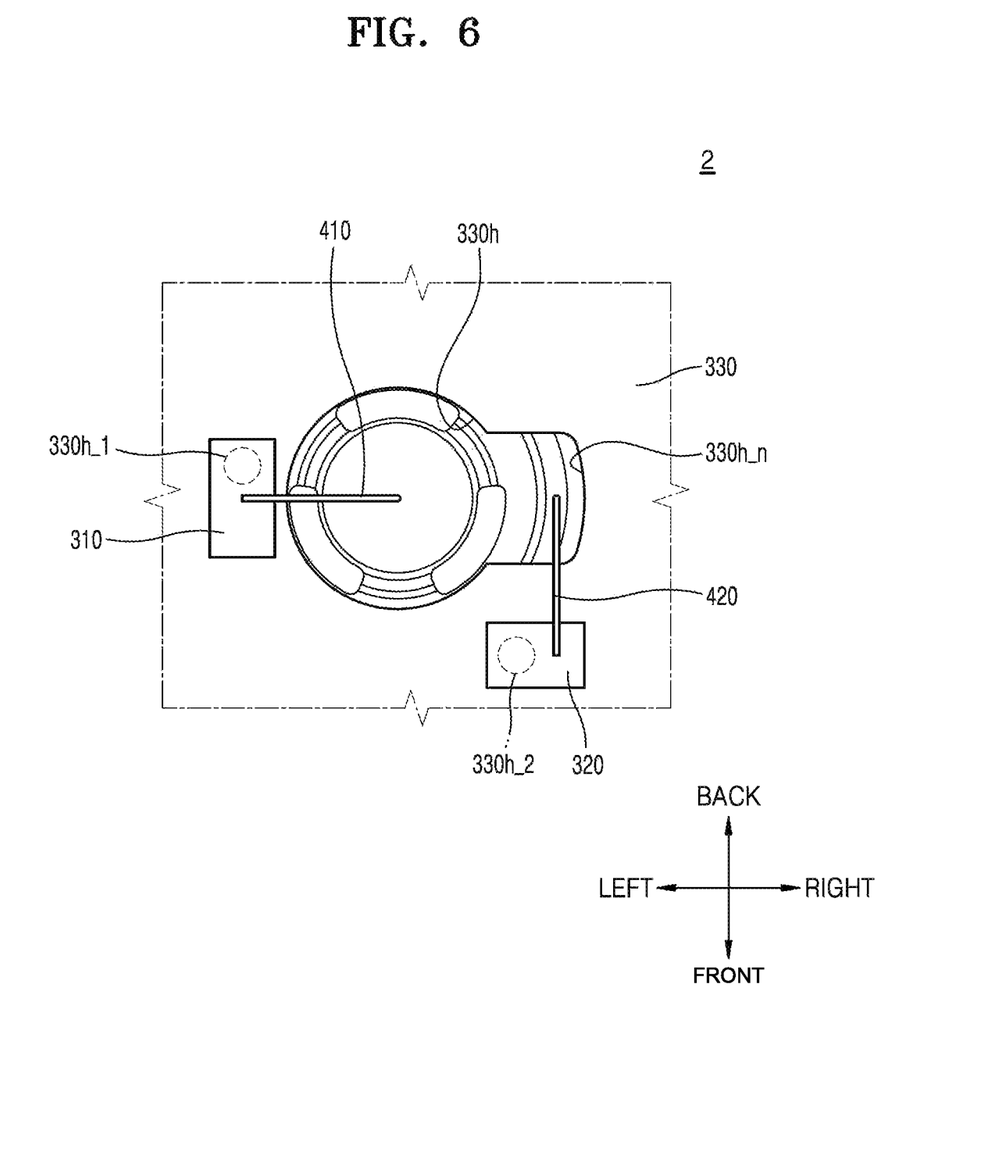
FIG. 6 is an enlarged plan view schematically illustrating a portion of FIG. 5.
Figure 7:
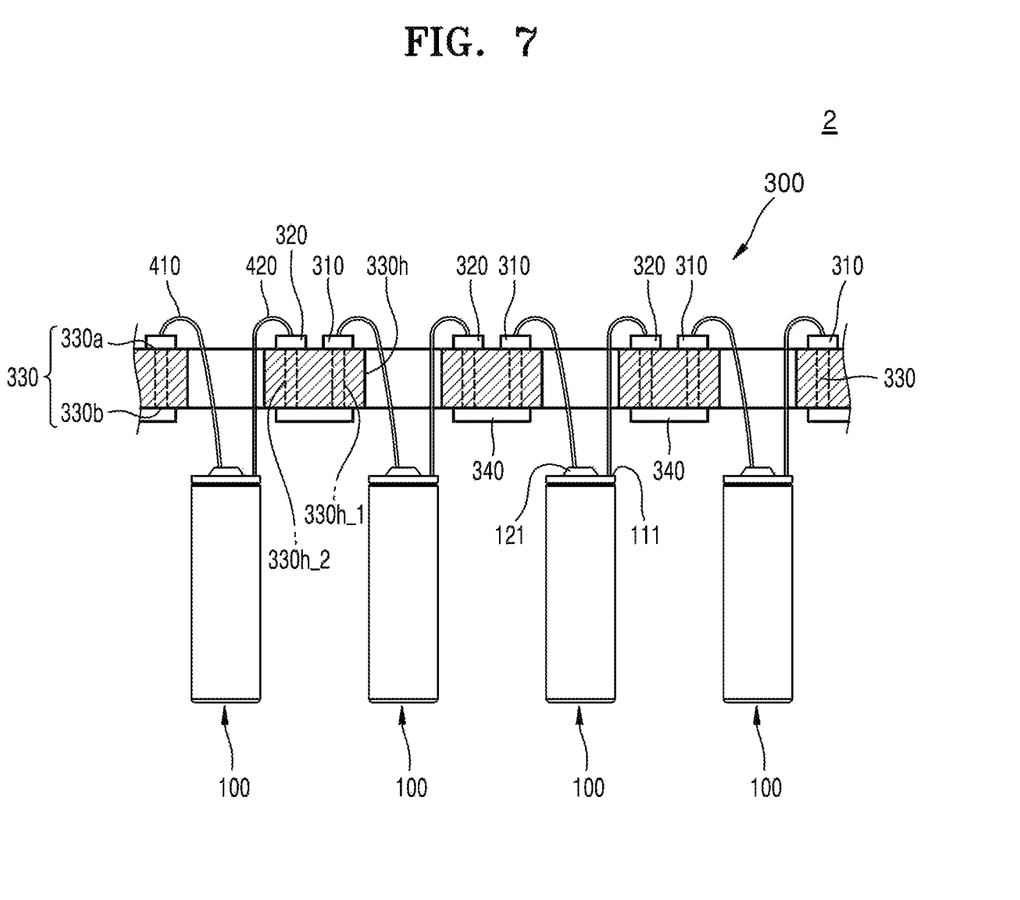
FIG. 7 is a cross-sectional view schematically illustrating the battery pack of FIG. 5.

FIG. 5 is a perspective view schematically illustrating a battery pack 2 according to another embodiment of the present disclosure; FIG. 6 is an enlarged plan view schematically illustrating a portion of FIG. 5; and FIG. 7 is a cross-sectional view schematically illustrating the battery pack 2 of FIG. 5. FIG. 6 is an enlarged view illustrating one through hole and a peripheral structure thereof; and FIG. 7 schematically illustrates a cross section taken along the line VII-VII of FIG. 5.

The embodiment of FIGS. 5 to 7 may be different from the above embodiment in terms of a configuration of the first conductive plate 310 and the second conductive plate 320. In the embodiment of FIGS. 5 to 7, a first conductive plate 310 (herein referred to as a "first conductive pad 310") and a second conductive plate 320 (herein referred to as a "second conductive pad 320") may be arranged on a substrate unit 330. Herein, descriptions overlapping with those in the above-described embodiment will be omitted and the differences therebetween will be mainly described.

Referring to FIGS. 5 to 7, the battery pack 2 according to another embodiment of the present disclosure may include a plurality of battery cells 100 and a protection circuit module 300 arranged over the battery cells 100. The protection circuit module 300 may include a substrate unit 330, first and second conductive pads 310 and 320 arranged on the substrate unit 330, and first and second connection tabs 410 and 420 for electrically connecting the battery cells 100 to the first and second conductive pads 310 and 320. Although not illustrated in FIGS. 5 to 7, as illustrated in FIG. 1, the battery pack 2 according to an embodiment of the present disclosure may also include first and second holder structures 210 and 220 arranged over and under the plurality of battery cells 100, respectively, and a cooling unit 700 arranged under the plurality of battery cells 100.

Referring to FIGS. 5 and 6, in the battery pack 2 according to the present embodiment, the positive electrode 121 and the negative electrode 111 of each of the battery cells 100 may be exposed through a through hole 330h of the protection circuit module 300 arranged on the battery cells 100. The through hole 330h may be formed through the substrate unit 330 of the protection circuit module 300, that is, a PCB. Although not illustrated in FIG. 5, a protection circuit, a safety device, and the like for functioning as the protection circuit module 300 may be mounted on the substrate unit 330.

In an embodiment, as illustrated in FIG. 6, the through hole 330h may include an extension portion 330h_n partially opened in the right direction. A portion of the negative electrode 111 of the battery cell 100 may be exposed through the extension portion 330h_n.

The first conductive pad 310 and the second conductive pad 320 may be arranged on the top surface 330a of the substrate unit 330. In an embodiment, as illustrated in FIGS. 5 and 6, the first conductive pad 310 may be arranged on the left side of the through hole 330h, and the second conductive pad 320 may be arranged on the right front end of the through hole 330h adjacent to the extension portion 330h_n. However, this is merely an example and the positions of the first conductive pad 310 and the second conductive pad 320 may be modified according to various embodiments.

The first connection tab 410 may electrically connect one of the negative electrode 111 and the positive electrode 121 of the battery cell 100 to the first conductive pad 310. Also, the second connection tab 420 may electrically connect the other one of the negative electrode 111 and the positive electrode 121 of the battery cell 100 to the second conductive pad 320. In FIGS. 5 and 6, the first connection tab 410 may connect the positive electrode 121 of the battery cell 100 to the first conductive pad 310, and the second connection tab 420 may connect the negative electrode 111 of the battery cell 100 to the second conductive pad 320. The first and second connection tabs 410 and 420 may connect the battery cell 100 to the first and second conductive pads 310 and 320, respectively, through the through hole 330h of the substrate unit 330.

In the present embodiment, the first connection tab 410 and the second connection tab 420 may respectively include fusible links that electrically connect the battery cell 100 with the first conductive pad 310 and the battery cell 100 with the second conductive pad 320, respectively, and are fused, when an overcurrent flows through the battery cell 100, to block a current flow between the battery cell 100 and the first conductive pad 310 and a current flow between the battery cell 100 and the second conductive pad 320, respectively. That is, the first connection tab 410 and the second connection tab 420 may function as a tab electrically connecting the battery cell 100 with the first conductive pad 310 and the battery cell 100 with the second conductive pad 320 and may also function as a fuse.

Referring to FIGS. 6 and 7, one side of the first connection tab 410 may be connected to the positive electrode 121 of the battery cell 100, and the other side of the first connection tab 410 may be electrically connected to the first conductive pad 310. Similarly, one side of the second connection tab 420 may be connected to the negative electrode 111 of the battery cell 100, and the other side of the second connection tab 420 may be electrically connected to the second conductive pad 320.

In an embodiment, a third conductive pad 340 may be further arranged on the other surface 330b of the substrate unit 330. The third conductive pad 340 may be a conductive pattern, such as a wiring line, or may be a plate-shaped conductive plate having a plurality of holes. The third conductive pads 340 arranged on the bottom surface 330b of the substrate unit 330 may be electrically connected to the first conductive pads 310 and the second conductive pads 320 arranged on the top surface 330a of the substrate unit 330.

As illustrated in FIG. 7, in an embodiment, the substrate unit 330 may have a first via hole 330h_1 at a position corresponding to the first conductive pad 310 and a second via hole 330h_2 at a position corresponding to the second conductive pad 320. A conductive material may be buried in the first via hole 330h_1 and the second via hole 330h_2, the first conductive pad 310 and the third conductive pad 340 may be electrically connected through the first via hole 330h_1, and the second conductive pad 320 and the third conductive pad 340 may be electrically connected through the second via hole 330h_2. As such, the first conductive pad 310 and the second conductive pad 320 may be electrically connected to the third conductive pad 340 to form a current path.

Figure 8:
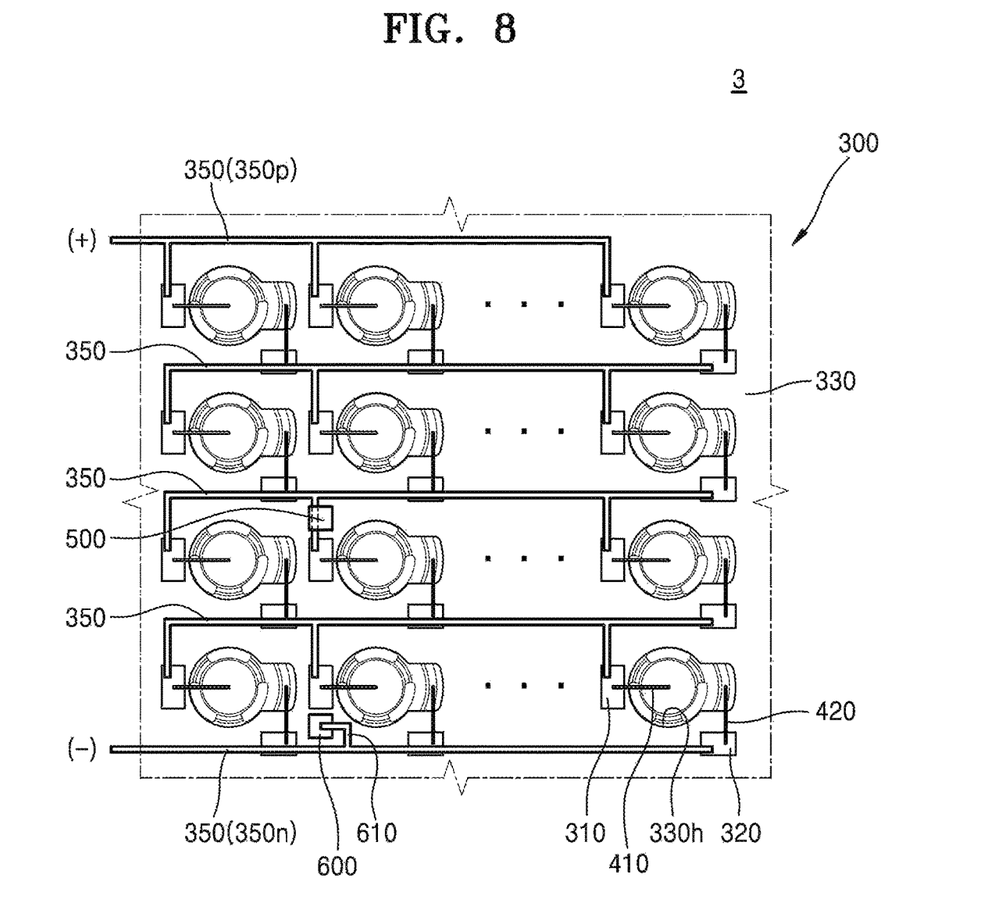
FIG. 8 is a plan view schematically illustrating a battery pack according to another embodiment of the present disclosure.

FIG. 8 is a plan view schematically illustrating a battery pack 3 according to another embodiment of the present disclosure. The embodiment of FIG. 8 may be different from the embodiment of FIGS. 5 to 7 in terms of a configuration of electrical connections of the first conductive pad 310 and the second conductive pad 320. Herein, descriptions overlapping with those in the above-described embodiment will be omitted and the difference therebetween will be mainly described.

Referring to FIG. 8, as in the above-described embodiment, the battery pack 3 according to another embodiment of the present disclosure may include a first conductive pad 310 and a second conductive pad 320 arranged on a top surface 330a of a substrate unit 330. The first conductive pad 310 and the second conductive pad 320 may be arranged around a through hole 330h of the substrate unit 330. A first connection tab 410 may electrically connect the battery cell 100 with the first conductive pad 310, and a second connection tab 420 may electrically connect the battery cell 100 with the second conductive pad 320. As described above, the first connection tab 410 may be connected to one of the positive electrode 121 and the negative electrode 111 of the battery cell 100, and the second connection tab 420 may be connected to the other one of the positive electrode 121 and the negative electrode 111 of the battery cell 100.

In the present embodiment, a conductive pattern 350 may be arranged on the top surface 330a of the substrate unit 330 to electrically connect the first conductive pad 310 and the second conductive pad 320 to each other. As illustrated in FIG. 8, the conductive pattern 350 may be formed as a pattern, such as a conductive line. Conductive patterns 350 may be arranged to electrically connect first conductive pads 310 adjacent to nth-row through holes 330h arranged in the left/right direction and second conductive pads 320 adjacent to (n+1)th-row through holes 330h. Among the conductive patterns 350, a conductive pattern 350p located at an outermost side of the substrate unit 330 may electrically connect the first conductive pads 310 adjacent to the first-row through holes 330h, and a conductive pattern 350n located at another outermost side of the substrate unit 330 may electrically connect the second conductive pads 320 adjacent to the mth-row through holes 330h. The conductive pattern 350p may be connected to an external positive (+) terminal, and the conductive pattern 350n may be connected to an external negative (−) terminal.

In an embodiment, a protection circuit, a safety device, and the like for functioning as a protection circuit module 300 may be mounted on the substrate unit 330. In the present embodiment, a fuse 500 for blocking a current flow between the conductive pattern 350 and the first conductive pad 310 and a current flow between the conductive pattern 350 and the second conductive pad 320 by being fused when an overcurrent flows therethrough may be arranged on the substrate unit 330. In an embodiment, as illustrated in FIG. 8, the fuse 500 may be connected between the first conductive pad 310 and the conductive pattern 350. Although not illustrated, in another embodiment, the fuse 500 may be connected between the second conductive pad 320 and the conductive pattern 350.

Also, a thermistor or a PTC device may be arranged as a safety device on the substrate unit 330. FIG. 8 illustrates a case in which a thermistor 600 is arranged on the substrate unit 330. The thermistor 600 may be connected to the conductive pattern 350 through a connection line 610.

Figure 9:
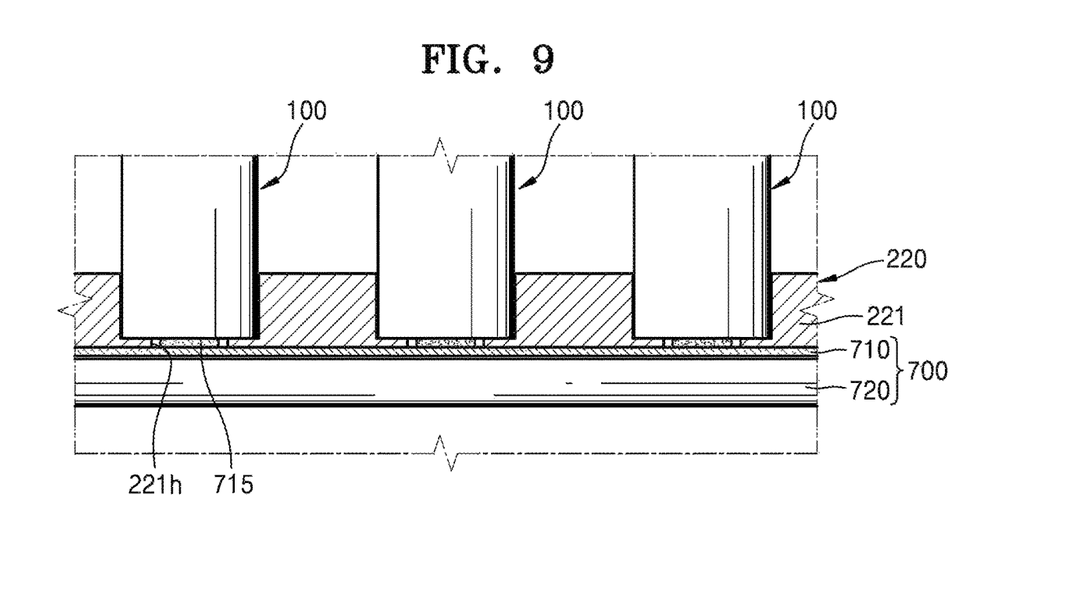
FIG. 9 is a partial cross-sectional view schematically illustrating a battery pack according to an embodiment of the present disclosure.

FIG. 9 is a cross-sectional view schematically illustrating a battery pack according to an embodiment of the present disclosure. FIG. 9 illustrates a lower portion of the battery pack.

Referring to FIG. 9, a cooling unit 700 may be arranged under battery cells 100. The cooling unit 700 may include a thermoconductive plate 710 and a flow path 720 through which a cooling fluid passes. The bottom surface of the battery cells 100 may be exposed through a hole 221h formed in a bottom insulating plate 221 of a second holder structure 220.

As described above, the thermoconductive plate 710 may include a thermoconductive material, such as an anodized aluminum plate, and may be thermally connected to the bottom surface of the battery cell 100 through a thermoconductive material, such as thermoconductive silicone 715.

The flow path 720 may be arranged under the thermoconductive plate 710. A cooling fluid may move through the flow path 720. A liquid, such as water, or a gas, such as air, may be used as the cooling fluid.

In the present embodiment, the cooling unit 700 may include both the thermoconductive plate 710 and the flow path 720 through which the cooling fluid passes; however, the present disclosure is not limited thereto. In an alternative embodiment, the cooling unit 700 may include one of the thermoconductive plate 710 and the flow path 720 through which the cooling fluid passes.

According to battery packs according to embodiments of the present disclosure, the connection tabs electrically connecting the battery cells with the conductive plates may be prevented or substantially prevented from being deformed or broken and, thus, a mechanically and electrically stable battery pack may be provided.

Also, according to battery packs according to embodiments of the present disclosure, space utilization may be improved by arranging a cooling structure for cooling the battery cells under the battery cells.

Although the present disclosure has been described with reference to some embodiments illustrated in the drawings, this is merely an example and those of ordinary skill in the art will understand that various modifications and other equivalent embodiments may be derived therefrom. Thus, the spirit and scope of the present disclosure should be defined by the appended claims.

It is to be understood that embodiments described herein should be considered in a descriptive sense and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as set forth by the following claims.

What is claimed is:

1. A battery pack comprising:
 a plurality of battery cells, each comprising a negative electrode and a positive electrode arranged on a same side of a respective battery cell;
 a holder on the plurality of battery cells and comprising holes exposing the positive and negative electrodes;
 a substrate arranged on the holder and comprising a first surface and a second surface located on opposite sides of the substrate, and a plurality of through holes exposing the negative electrode and the positive electrode of each of the plurality of battery cells;
 a conductive pad unit comprising a first conductive pad and a second conductive pad, each arranged on the first surface of the substrate;
 a first connection tab extending through a first through hole of the plurality of through holes and electrically connecting one of the negative electrode and the positive electrode of a first battery cell of the plurality of battery cells with the first conductive pad through the first through hole;

a second connection tab extending through the first through hole and electrically connecting the other one of the negative electrode and the positive electrode of the first battery cell with the second conductive pad through the first through hole; and a third conductive pad arranged on the second surface of the substrate, wherein the substrate further comprises a first via hole and a second via hole, each penetrating the substrate, and the first conductive pad and the third conductive pad are electrically connected through the first via hole, and the second conductive pad and the third conductive pad are electrically connected through the second via hole.

2. The battery pack of claim 1, wherein the substrate comprises a printed circuit board.

3. The battery pack of claim 1, wherein one of the positive electrode and the negative electrode of each of the plurality of battery cells is located at a central portion of a first end side of the respective battery cell, and the other one of the positive electrode and the negative electrode is located at a peripheral portion of the first end side.

4. The battery pack of claim 1, wherein the first connection tab and the second connection tab respectively comprise fusible links that electrically connect the first battery cell with the first conductive pad and the first battery cell with the second conductive pad, respectively, wherein the fusible links are fused, when an overcurrent flows therethrough, to block current flow between the first battery cell and the first conductive pad and current flow between the first battery cell and the second conductive pad, respectively.

5. The battery pack of claim 1, further comprising a conductive pattern arranged on a surface of the substrate to electrically connect the first conductive pad with the second conductive pad.

6. The battery pack of claim 5, wherein the conductive pattern comprises fuses that are fused, when an overcurrent flows therethrough, to block current flow between the conductive pattern and the first conductive pad and current flow between the conductive pattern and the second conductive pad, respectively.

7. The battery pack of claim 5, further comprising a safety device mounted on the substrate, wherein the safety device is electrically connected to the conductive pattern.

8. The battery pack of claim 1, further comprising a cooling unit installed on a second end side opposite a first end side of the plurality of battery cells with the plurality of battery cells therebetween.

9. The battery pack of claim 8, wherein the cooling unit comprises a thermoconductive plate.

10. The battery pack of claim 8, wherein the cooling unit comprises a flow path through which a cooling fluid is configured to flow.

* * * * *